United States Patent
Wakahoi et al.

(10) Patent No.: US 6,787,262 B2
(45) Date of Patent: Sep. 7, 2004

(54) FUEL CELL STACK HAVING INTERMEDIATE PLATE FOR RESTRICTING MOVEMENT OF BOLT MEMBERS FOR FASTENING STACKED BODY

(75) Inventors: Toshiya Wakahoi, Wako (JP); Noriaki Osao, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 475 days.

(21) Appl. No.: 10/003,777

(22) Filed: Nov. 15, 2001

(65) Prior Publication Data

US 2002/0058176 A1 May 16, 2002

(30) Foreign Application Priority Data

Nov. 15, 2000 (JP) .................................... P2000-347989

(51) Int. Cl.[7] ............................................... H01M 2/00
(52) U.S. Cl. ......................................................... 429/34
(58) Field of Search .......................................... 429/34

(56) References Cited

U.S. PATENT DOCUMENTS 3,881,956 A    5/1975    Williams ..................... 136/86
5,547,777 A    8/1996    Richards ..................... 429/32
6,620,540 B2 *  9/2003   Sugita et al. .................. 429/34

FOREIGN PATENT DOCUMENTS

JP    Hei 8-171926    7/1996

* cited by examiner

Primary Examiner—Patrick Ryan
Assistant Examiner—Thomas H. Parsons
(74) Attorney, Agent, or Firm—Lahive & Cockfield, LLP; Anthony A. Laurentano

(57) ABSTRACT

A fuel cell stack for reducing the bending of the stacked body in the stacking direction is disclosed, thereby preventing the interference between the stacked body built into a vehicle and other structures in the vehicle. The fuel cell stack comprises a stacked body having stacked unit fuel cells, each being placed between separators, wherein each unit fuel cell has an anode, a cathode, and an electrolyte membrane placed therebetween; fastening plates provided at either end of the stacked body; an intermediate plate provided at an intermediate position of the stacked body; and bolt members inserted through the intermediate plate in the stacking direction in a manner such that the movement of the bolt members with respect to the intermediate plate in the direction perpendicular to the stacking direction is restricted. The stacked body is fastened together by fastening the fastening plates by using the bolt members.

8 Claims, 6 Drawing Sheets

FUEL CELL STACK HAVING INTERMEDIATE PLATE FOR RESTRICTING MOVEMENT OF BOLT MEMBERS FOR FASTENING STACKED BODY

BACKGROUND OF THE INVENTION

1. Field of the Invention

The present invention relates to a fuel cell stack having stacked unit fuel cells, each having a structure in which an anode and a cathode are provided on either side of an electrolyte membrane, and each unit fuel cell is placed between separators.

2. Description of the Related Art

Typically, solid polymer electrolyte fuel cells have a unit fuel cell in which an anode and a cathode are provided on either side of an electrolyte membrane consisting of a polymer ion exchange membrane (i.e., cation exchange membrane). The unit fuel cell is placed between separators which are provided for supporting the unit fuel cell. Generally, a specific number of unit fuel cells are stacked to obtain a fuel cell stack.

In this kind of fuel cell stack, a fuel gas supplied to the anode, such as hydrogen, is ionized to hydrogen ions on catalytic electrodes, and the hydrogen ions are transferred to the cathode via an electrolyte membrane which is humidified to have an appropriate level of humidity. During this process, electrons are generated and flow to an external circuit, providing DC (direct current) electrical energy. An oxidizing gas such as oxygen or air is supplied to the cathode, and the hydrogen gas, electrons, and oxygen gas react at the cathode, thereby generating water.

Japanese Unexamined Patent Application, First Publication No. Hei 8-171926 discloses an example of the fuel cell stack. In the fuel cell stack, plural sets of the unit fuel cell and the separators are stacked to have a stacked body, and electrical power is drawn from terminals provided at either side (in the stacking direction) of the stacked body. In the disclosed system, a plurality of such stacked bodies are provided, and a member for supplying and discharging fuel or the like is provided between adjacent stacked bodies. In addition, a pressing mechanism for pressing the adjacent stacked bodies (between which the above-explained member is provided) from either side of the stacked bodies towards the center thereof is further provided.

When the above fuel cell stack is assembled, the member for supplying and discharging fuel (or the like) and the pressing mechanism are first placed in the horizontal direction, and then the unit fuel cells are stacked between this member and the pressing mechanism. This process of stacking the unit fuel cells and separators in the horizontal direction has a problem in that it is difficult to precisely position the adjacent unit fuel cell and separator, or the adjacent separators with each other.

Conversely, if the unit fuel cells and the separators are stacked in turn in the vertical direction, the adjacent unit fuel cell and separator, or the adjacent separators can be easily and precisely positioned in the assembly process. For example, as shown in FIG. 7, one of end plates 102 is stacked via a cushioning member 101 on one of horizontally-laid backup plates (i.e., fastening plates) 100, and on this end plate 102, an insulating plate 103 and a terminal plate 104 are stacked. All the unit fuel cells 105 and separators 106 and 107 are stacked on the terminal plate 104, in a manner such that each unit fuel cell 105 is located between the separators 106 and 107. The other end plate 102 is further stacked via a terminal plate 104 and an insulating plate 103 on these stacked unit fuel cells and separators, and on this end plate 102, the other backup plate (i.e., fastening plate) 100 is further stacked via disc springs 108. This stacked body is fastened using the bolt members 109 from the outside of either backup plate 100, so as to obtain an assembled body.

In comparison with the horizontally-stacked type, the above fuel cell stack has an advantage in that the adjacent stacked unit fuel cell 105 and one of the separators 106 and 107, or the adjacent separators 106 and 107, can be precisely positioned with each other. However, all the unit fuel cells 105 and separators 106 and 107 are stacked on a single reference base which is one of the backup plates 100; thus, errors in shape (i.e., deformation) of the unit fuel cells 105 and the separators 106 and 107 are cumulative; thus, the stacked body 110 may bend in the stacking direction. Therefore, when another backup plate 100 is stacked on the deformed body and the backup plates 100 are fastened together by using the bolt members 109, the fuel cell stack itself may bend in the stacking direction. If such a fuel cell stack having a bent shape is built into a vehicle, the fuel cell stack may interfere with other structures.

SUMMARY OF THE INVENTION

In consideration of the above circumstances, an object of the present invention is to provide a fuel cell stack for reducing the bending of the stacked body in the stacking direction, thereby preventing the interference between the stacked body built into a vehicle and other structures in the vehicle.

Therefore, the present invention provides a fuel cell stack comprising:

a stacked body (e.g., stacked body 17 in an embodiment explained below) having a plurality of stacked unit fuel cells (e.g., unit fuel cells 14 in the embodiment explained below), each unit fuel cell being placed between and supported by a pair of separators (e.g., separators 15, 16 in the embodiment explained below), wherein each unit fuel cell has an anode (e.g., anode 12 in the embodiment explained below), a cathode (e.g., cathode 13 in the embodiment explained below), and an electrolyte membrane (e.g., solid polymer electrolyte membrane 11 in the embodiment explained below) which is placed between the anode and the cathode;

fastening plates (e.g., backup plates 29 in the embodiment explained below) provided at either end of the stacked body in the stacking direction of the stacked body;

an intermediate plate (e.g., intermediate plate 39 in the embodiment explained below) provided at an intermediate position of the stacked body in the stacking direction; and bolt members (e.g., stud bolts 19 in the embodiment explained below) inserted through the intermediate plate in the stacking direction in a manner such that the movement of the bolt members with respect to the intermediate plate in the direction perpendicular to the stacking direction is restricted so as to fix the relative position between the intermediate plate and the bolt members in the relevant direction, wherein the bolt members are also inserted through the fastening plates in the stacking direction, and the stacked body is fastened together by fastening the fastening plates towards the center of the fastening plates by using the bolt members.

As a typical example, the intermediate plate is provided approximately at the center of the stacked body in the stacking direction.

The bolt members may also be inserted through the stacked body in the stacking direction.

The above structure provides the intermediate plate at an intermediate position of the stacked body in the stacking direction, in other words, the stacked body including the stacked unit fuel cells and separators is divided into two portions located at either side of the intermediate plate. Therefore, cumulative errors in shape in the direction of the thickness of the stacked body (i.e., the unit fuel cells and separators) can be substantially reduced to half. Accordingly, the bending of the stacked body in the stacking direction can be considerably reduced, and the interference between the fuel cell stack built into the vehicle and any other structure in the vehicle can be prevented. The present invention is especially effective when the separators are made by press forming, where errors in shape tend to occur in this case.

In addition, the bolt members are inserted through the intermediate plate in the stacking direction in a manner such that the movement of the bolt members with respect to the intermediate plate in the direction perpendicular to the stacking direction is restricted, and the stacked body is fastened together by fastening the fastening plates towards the center of the fastening plates by using the bolt members. Therefore, after the fastening process, the movement of the intermediate plate with respect to the bolt members in the direction perpendicular to the stacking direction is restricted, thereby preventing a shift of the intermediate plate due to vibration or the like.

Therefore, in comparison with structures in which the movement of the intermediate plate with respect to the bolt members is not restricted, undesirable shifts of the intermediate plate can be avoided. In addition, the bolt members inserted into the intermediate plate can function as a guide for stacking the unit fuel cells and the separators, thereby improving the working efficiency in the stacking process.

Typically, each bolt member has a fitting portion; and the intermediate plate has a fitting hole into which the fitting portion of the bolt member is fit.

Preferably, the movement of the bolt members with respect to the intermediate plate in the stacking direction is also restricted so as to fix the relative position between the intermediate plate and the bolt members in the relevant direction.

In this case, typically, each bolt member has a fitting portion; and the intermediate plate has a fitting hole into which the fitting portion of the bolt member is fit, wherein the fitting portion has a flange portion and the fitting hole has a corresponding step portion so as to restrict the movement of the bolt members with respect to the intermediate plate in the stacking direction.

It is possible that a plurality of intermediate plates through which the bolt members are inserted are provided, wherein the movement of the bolt members in the direction perpendicular to the stacking direction is restricted so as to fix the relative position between the intermediate plates and the bolt members in the relevant direction.

In this case, preferably, the movement of the bolt members with respect to the intermediate plates in the stacking direction is also restricted so as to fix the relative position between the intermediate plates and the bolt members in the relevant direction.

DESCRIPTION OF THE PREFERRED EMBODIMENTS

Hereinafter, an embodiment of the fuel cell stack according to the present invention will be explained in detail with reference to FIGS. 1 to 6.

Figure 1:
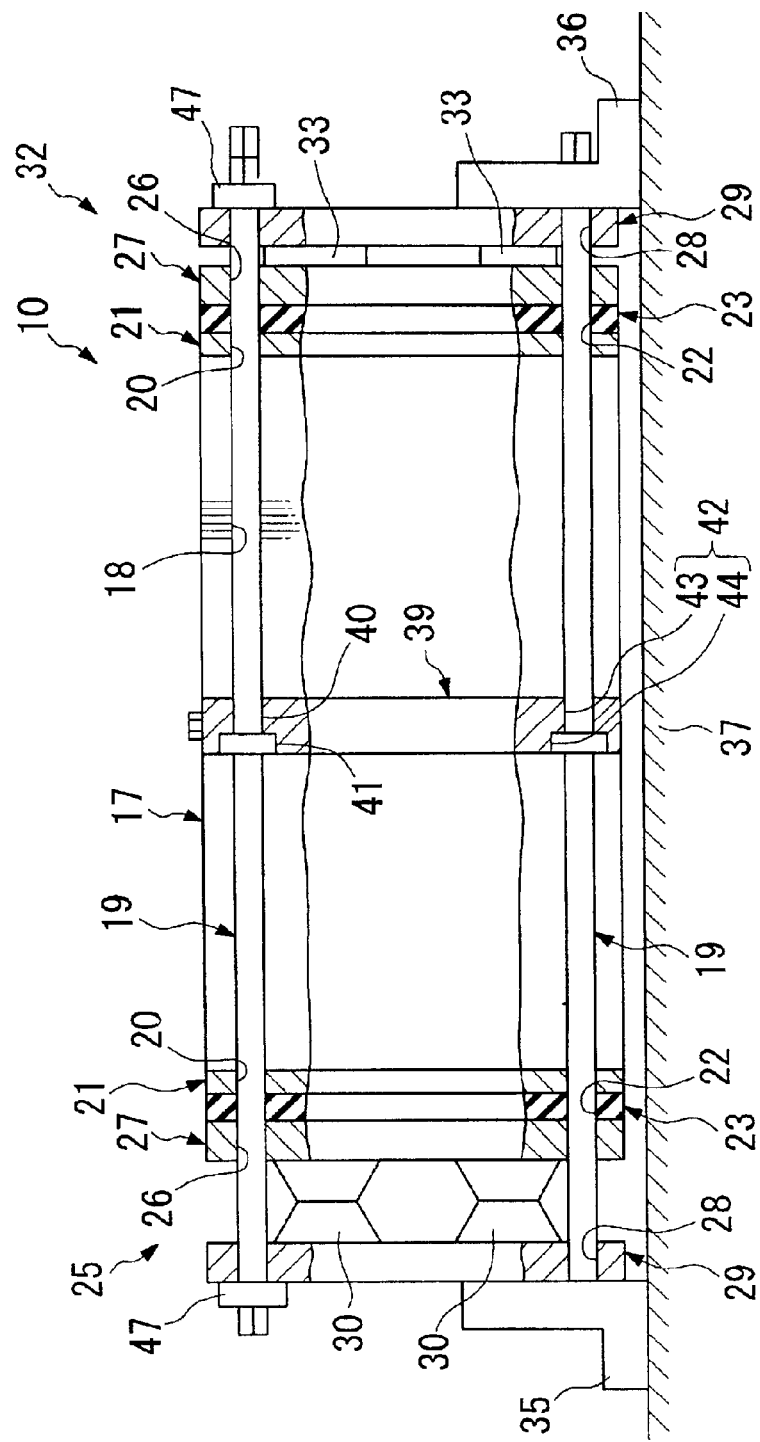
FIG. 1 is a cross-sectional side view showing the fuel cell stack built in a vehicle, as an embodiment of the present invention.
Figure 2:
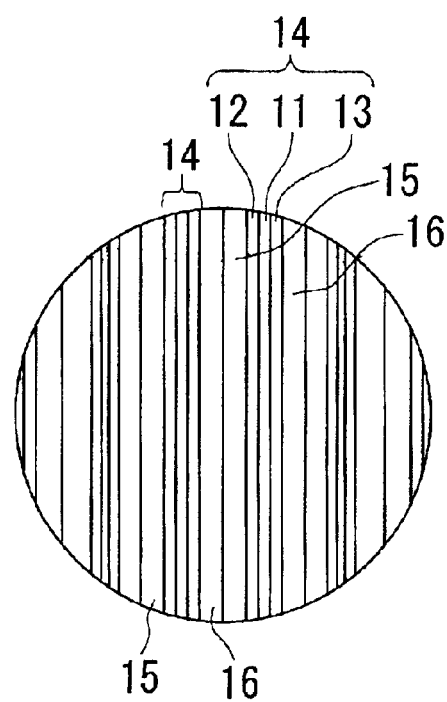
FIG. 2 is a partially-enlarged sectional view showing the unit fuel cells and the separators in the embodiment.

FIG. 1 shows the structure of a fuel cell stack 10 of the present embodiment, which is built into a vehicle. As shown in FIG. 2, each unit fuel cell 14 is located between a pair of separators 15 and 16 in the fuel cell stack 10. In the unit fuel cell 14, a solid polymer electrolyte membrane 11 (corresponding to the electrolyte membrane of the present invention) is placed between an anode 12 and a cathode 13. Plural unit fuel cells 17 are stacked in the horizontal direction so as to form a stacked body 17, and electrical power is drawn from either side of the stacked body.

Hydrogen gas is supplied to a space between the adjacent anode 12 and separator 15, while air is supplied to a space between the adjacent cathode 13 and separator 16. In addition, coolant is supplied to passages between the back faces of the separators 15 and 16, so as to cool each unit fuel cell 14.

The stacked unit fuel cells 14 and separators 15 and 16 have insertion holes 18 into which a plurality of stud bolts (corresponding to the bolt members of the present invention) are inserted, by which the stacked unit fuel cells 14 and separators 15 and 16 are fastened from either side of the stacked body 17. Here, terminal plates 21 are provided at either side of the stacked body 17, and each terminal plate 21 also has insertion holes through which the stud bolts 19 are inserted.

At the outer side of one of the terminal plates 21, a fastening mechanism (or structure) 25 is provided via an insulating plate 23 along the stacking direction, where the insulating plate 23 also has insertion holes 22 through which the stud bolts 19 pass.

The fastening mechanism 25 has (i) an end plate 27 having insertion holes 26 through which the stud bolts 19 pass, (ii) a backup plate 29 (corresponding to the fastening plate of the present invention) having insertion holes 28 through which the stud bolts 19 pass, and (iii) disc springs 30 inserted between the end plate 27 and the backup plate 29.

At the outer side of the other terminal plate 21, a fastening mechanism (or structure) 32 is provided via an insulating plate 23 along the stacking direction, where the insulating plate 23 has insertion holes 22 through which the stud bolts 19 pass.

The fastening mechanism 32 has (i) an end plate 27 having insertion holes 26 through which the stud bolts 19 pass, (ii) a backup plate 29 (corresponding to the fastening plate of the present invention) having insertion holes 28 through which the stud bolts 19 pass, and (iii) a cushioning member 33 such as a washer, which is inserted between the end plate 27 and the backup plate 29. The cushioning member 33 may be a disc spring or an elastic bag which contains an internal fluid and which may be made of a thin metallic material.

The fastening mechanisms 25 and 32 provide a desired fastening force to each unit fuel cell 14 of the stacked body 17. That is, the backup plates 29 provided at either end of the stacked body 17 in the stacking direction are fastened together by using the stud bolts 19, so that the fastening mechanism 25 which includes one of the backup plate 29 and the fastening mechanism 32 which includes the other backup plate 29 fasten the unit fuel cells 14 of the stacked body 17.

An attachment member 35 for installing the fuel cell stack into the vehicle body is attached to the backup plate 29 of the fastening mechanism 25 at one end of the stacked body. A similar attachment member 36 for installing the fuel cell stack into the vehicle body is attached to the backup plate 29 of the fastening mechanism 32 at the other end of the stacked body. These attachment members 35 and 36 are fastened to a panel 37 of the vehicle body.

In the above explanation, the attachment members 35 and 36 are attached to the backup plates 29 of the fastening mechanisms 25 and 32; however, the attachment members 35 and 36 may be attached to the end plates 27 which are placed at outer sides of the terminal plates 21.

Also in the present embodiment, an intermediate plate 39 made of conductive metal or the like is provided at the center position of the stacked body 17 (which includes the stacked unit fuel cells 14 and separators 15 and 16) in the stacking direction.

Figure 3:
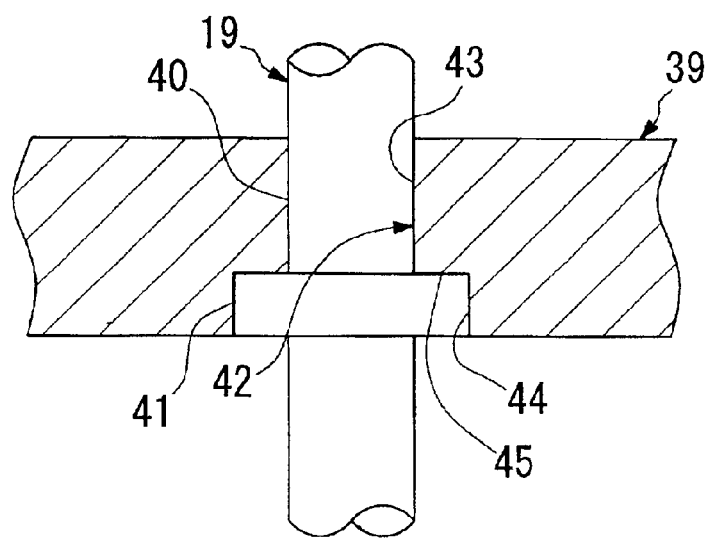
FIG. 3 is a partially-enlarged sectional view showing the intermediate plate and the stud bolt in the embodiment.
Figure 4:
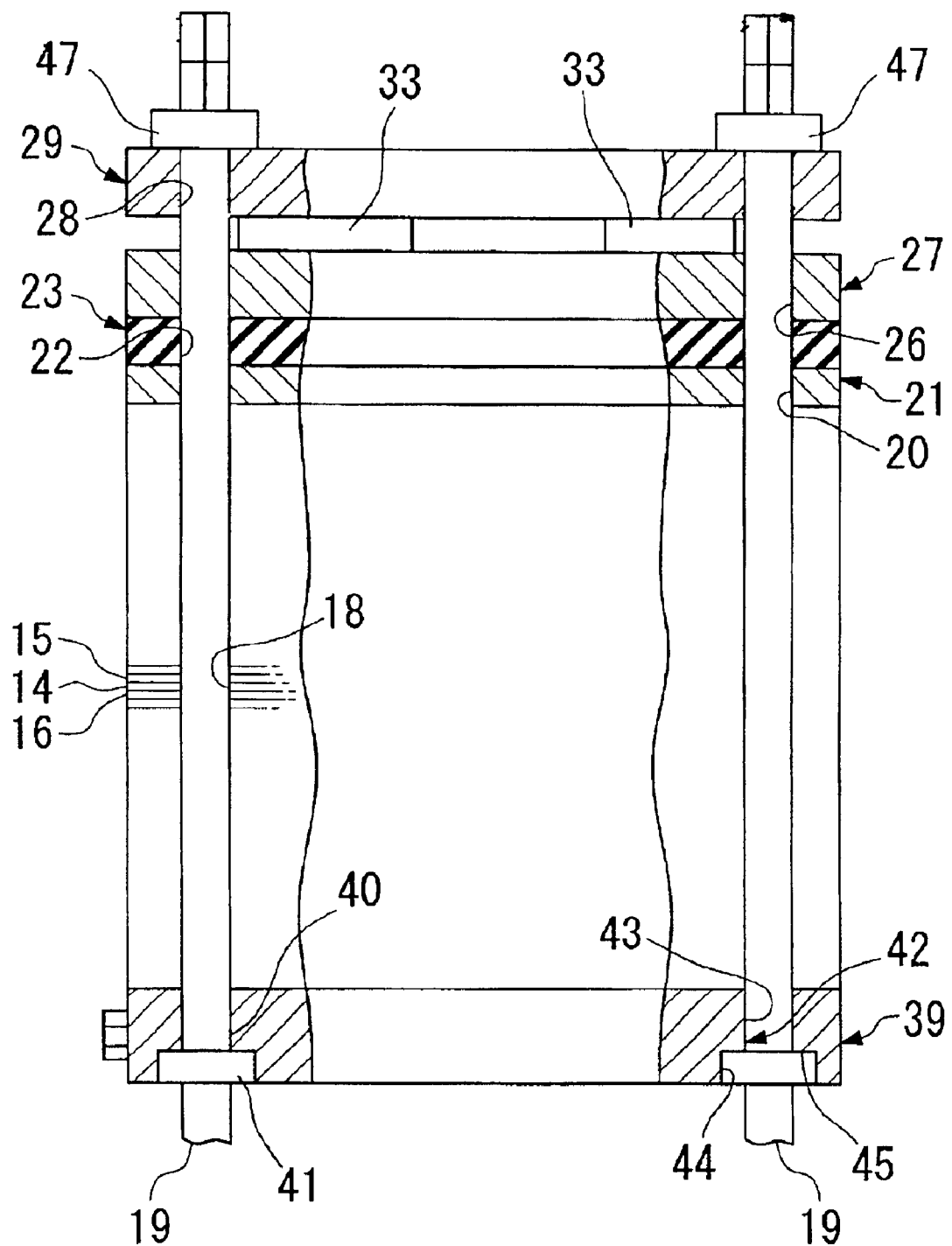
FIG. 4 is a cross-sectional side view showing a state of the fuel cell stack during the assembling process in the embodiment.
Figure 5:
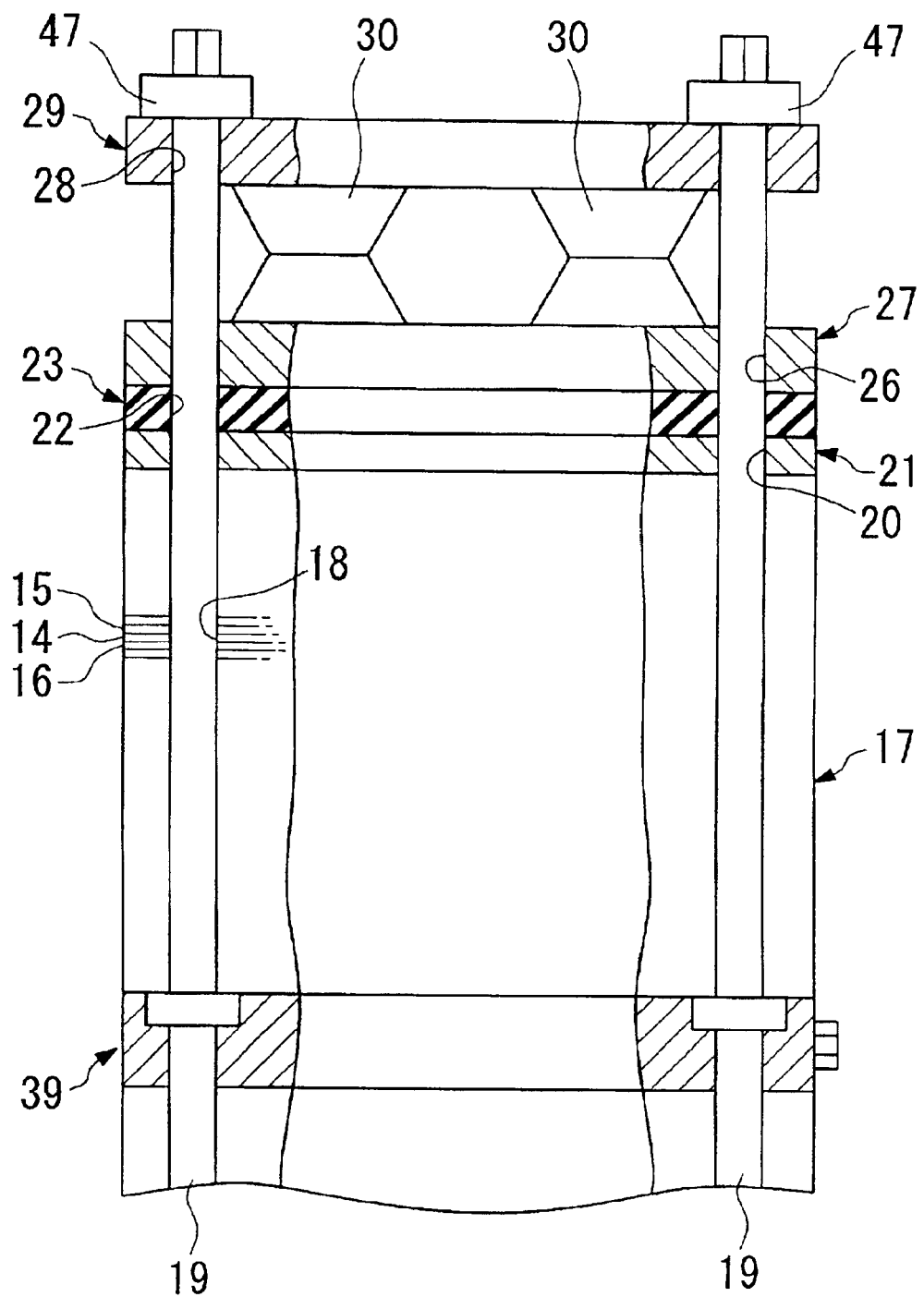
FIG. 5 is a cross-sectional side view showing another state of the fuel cell stack during the assembling process in the embodiment.

The intermediate plate 39 has fitting holes 42 through which the stud bolts 19 are inserted along the stacking direction of stacking the unit fuel cells 14 and separators 15 and 16, in a manner such that the movement of the stud bolts 19 in the direction perpendicular to the stacking direction is restricted. More specifically, as shown in FIG. 3, each stud bolt 19 has a fitting portion 40 formed at a predetermined center position, and a flange portion 41 which is adjacent to the fitting portion 40 and has a diameter larger than that of the fitting portion 40. The fitting hole 42 of the intermediate plate 39 has a shape corresponding to the fitting portion 40 and flange portion 41, that is, the fitting hole 42 has a first fitting hole 43 into which the fitting portion 40 is fit, and a second fitting hole 44 into which the flange portion 41 is fit. These fitting holes 43 and 44 are adjacent in the direction of the thickness of the intermediate plate.

The fitting portion 40 and the flange portion 41 of each stud bolt 19 are respectively fit into the first and second fitting holes 43 and 44, so that the stud bolts 19 are inserted into the intermediate plate 39 in a manner such that the movement of the stud bolts 19 in the direction perpendicular to the stacking direction is restricted. Such restriction of the movement of the stud bolts 19 in the direction perpendicular to the stacking direction can also be performed by providing one of the fitting portion 40 and the flange portion 41 and fitting the provided portion into a corresponding hole.

The above state in which the movement of the stud bolts 19 is restricted in the direction perpendicular to the stacking direction means that the relative position between the intermediate plate 39 and the stud bolts 19 is fixed by using a method of fitting, screwing, brazing, welding, or the like.

In addition, the flange portion 41 contacts the step portion 45 between the first fitting hole 43 and the second fitting hole 44, so that the movement of the stud bolts 19 with respect to the intermediate plate 39 in the stacking direction is also restricted.

In the assembling process of the fuel cell stack 10 having the above-explained structure, first, each stud bolt 19 is inserted through the fitting hole 42 of the intermediate plate 39 in a manner such that the fitting portion 40 of the stud bolt 19 is fit into the first fitting hole 43 and the flange portion 41 of the stud bolt 19 is fit into the second fitting hole 44. This intermediate plate 39 through which the stud bolts 19 pass is placed on a stand (not shown) in a manner such that the second fitting hole 44 is located at the lower side and the flange portion 41 of each stud bolt 19 is supported by the stand so as to prevent the stud bolts 19 from falling from the intermediate plate 39.

The upper face of the intermediate plate 39 (placed on the stand) is determined as a reference plane, on which the separator 15, the unit fuel cell 14, the separator 16, . . . are stacked in the vertical direction while the stud bolts 19 are inserted into the relevant insertion holes provided in the unit fuel cells and separators. Here, half of the sets of the separator 15, the unit fuel cell 14, and the separator 16 to be stacked in the fuel cell stack are stacked at this stage. On this stacked portion, the terminal plate 21 is stacked while the stud bolts 19 are inserted into the insertion holes 20 of the terminal plate 21. The insulating plate 23 is further stacked on the terminal plate 21 while the stud bolts 19 are inserted into the insertion holes 22 of the insulating plate 23. The end plate 27 is further stacked on the insulating plate 23 while the stud bolts 19 are inserted into the insertion holes 26 of the end plate 27.

The cushioning member 33 is then disposed on the end plate 27, and finally, the backup plate 29 is stacked while the stud bolts 19 are inserted into the insertion holes 28 of the backup plate 29. A nut 47 is then engaged with each stud bolt 19, so that the intermediate plate 39, the backup plate 29, and the plural sets of the unit fuel cell 14 and separators 15 and 16 between the intermediate plate 39 and the backup plate 29 are fastened together by the nuts 47 and the flange portions 41 of the stud bolts 19 (see FIG. 4).

The position of this structure is then reversed. The upper face of the intermediate plate 39 at this position is determined as a reference plane, on which the separator 15, the unit fuel cell 14, the separator 16, . . . are stacked in the vertical direction while the stud bolts 19 are inserted into the relevant insertion holes provided in the unit fuel cells and separators. Similar to the previous step, the remaining half of the sets of the separator 15, the unit fuel cell 14, and the separator 16 to be stacked in the fuel cell stack are stacked at this stage. On this stacked portion, the terminal plate 21 is stacked while the stud bolts 19 are inserted into the insertion holes 20 of the terminal plate 21. The insulating plate 23 is further stacked on the terminal plate 21 while the stud bolts 19 are inserted into the insertion holes 22 of the insulating plate 23. The end plate 27 is further stacked on the insulating plate 23 while the stud bolts 19 are inserted into the insertion holes 26 of the end plate 27.

The disc springs 30 are then disposed on the end plate 27, and finally, the backup plate 29 is stacked while the stud bolts 19 are inserted into the insertion holes 28 of the backup plate 29. A nut 47 is then engaged with each stud bolt 19, so that the intermediate plate 39, the backup plate 29, and the plural sets of the unit fuel cell 14 and separators 15 and 16 between the intermediate plate 39 and the backup plate 29 are fastened together by the nuts 47 and the flange portions 41 of the stud bolts 19 (see FIG. 5).

The attachment members 35 and 36 are then attached to the backup plates 29, and the fuel cell stack 10 is horizontally positioned and fastened to the panel 37 of the vehicle body by using the attachment members 35 and 36.

According to the fuel cell stack 10 of the present embodiment, the intermediate plate 39 is provided at the middle of the stacked body 17 in the stacking direction, where electrical power is drawn from either end of the stacked body. In other words, each divided (i.e., half) portion of the stacked body 17 including stacked unit fuel cells 14 and separators 15 and 16 is located at either side of the intermediate plate 39; therefore, cumulative errors in shape in the direction of the thickness of the stacked body can be substantially reduced to half.

Therefore, when the unit fuel cells 14 and separators 15 and 16 are stacked in the vertical direction so as to assemble the stacked body 17, the bending of the stacked body 17 in the stacking direction can be considerably reduced. Accordingly, the interference between the fuel cell stack built into the vehicle and any other structure in the vehicle can be prevented. In addition, the present invention is especially effective when the separators 15 and 16 are made by press forming, where errors in shape tend to occur in this case.

Additionally, each stud bolt 19 is inserted through the intermediate plate 39 in a manner such that the movement of the stud bolt 19 in the direction perpendicular to the stacking direction is completely restricted, and the backup plates 29 at either end of the stacked body 17 are fastened together by the stud bolts 19. Therefore, after the fastening process, the movement of the intermediate plate 39 with respect to the stud bolts 19 in the direction perpendicular to the stacking direction is restricted, thereby preventing a shift of the intermediate plate 39 due to vibration or the like.

Therefore, in comparison with structures in which the movement of the intermediate plate 39 with respect to the stud bolts 19 is not restricted, undesirable shifts of the intermediate plate 39 can be avoided in the present embodiment. In addition, the stud bolts 19 inserted into the intermediate plate 39 can function as a guide for stacking the unit fuel cells 14 and separators 15 and 16, thereby improving the working efficiency in the stacking process.

In the above-explained embodiment, the fitting portion 40 and the flange portion 41 of each stud bolt 19 are respectively fit into the first and second fitting holes 43 and 44 of the intermediate plate 39 so as to restrict the movement of the stud bolts 19 with respect to the intermediate plate 39 in both the stacking direction and the direction perpendicular to the stacking direction, where the stud bolt 19 is a single body. However, a variation as shown in FIG. 6 is also possible.

Figure 6:
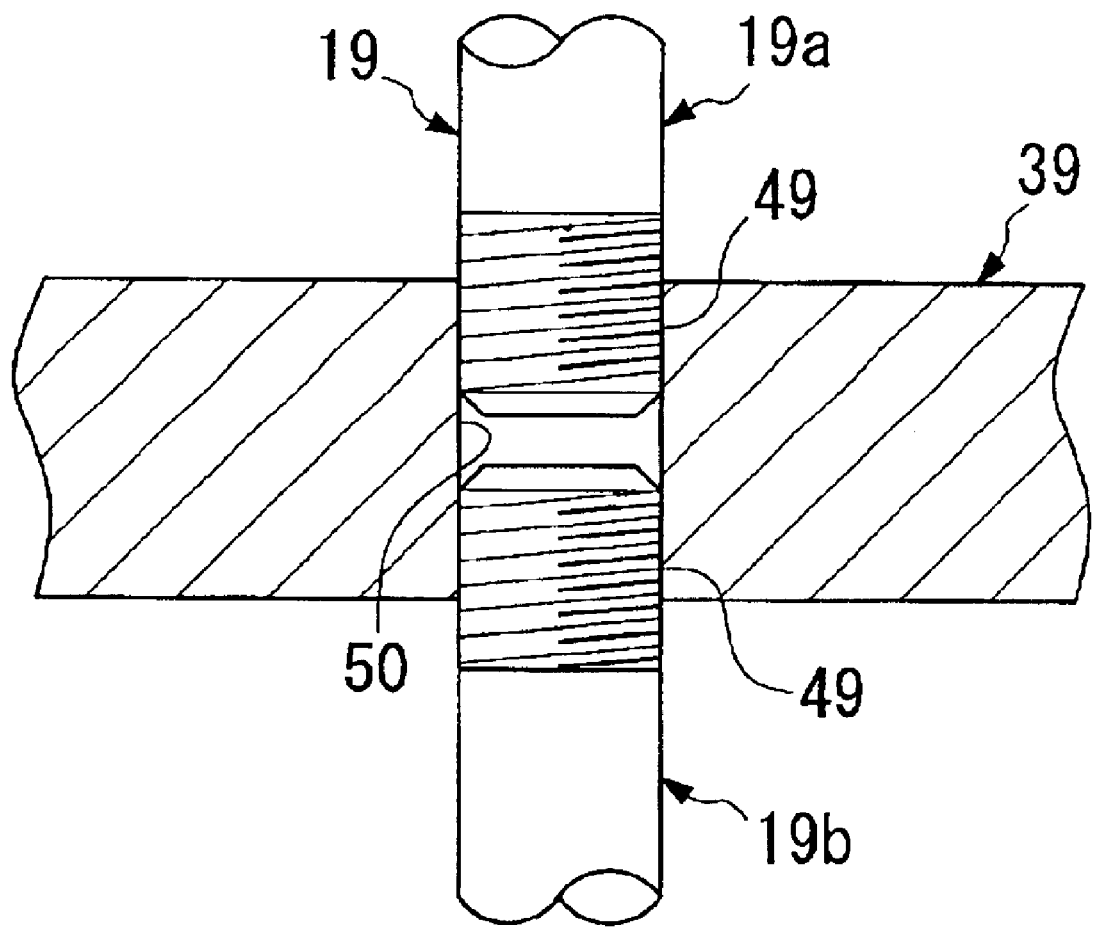
FIG. 6 is a partially-enlarged sectional view showing another example of the intermediate plate and the stud bolt.
Figure 7:
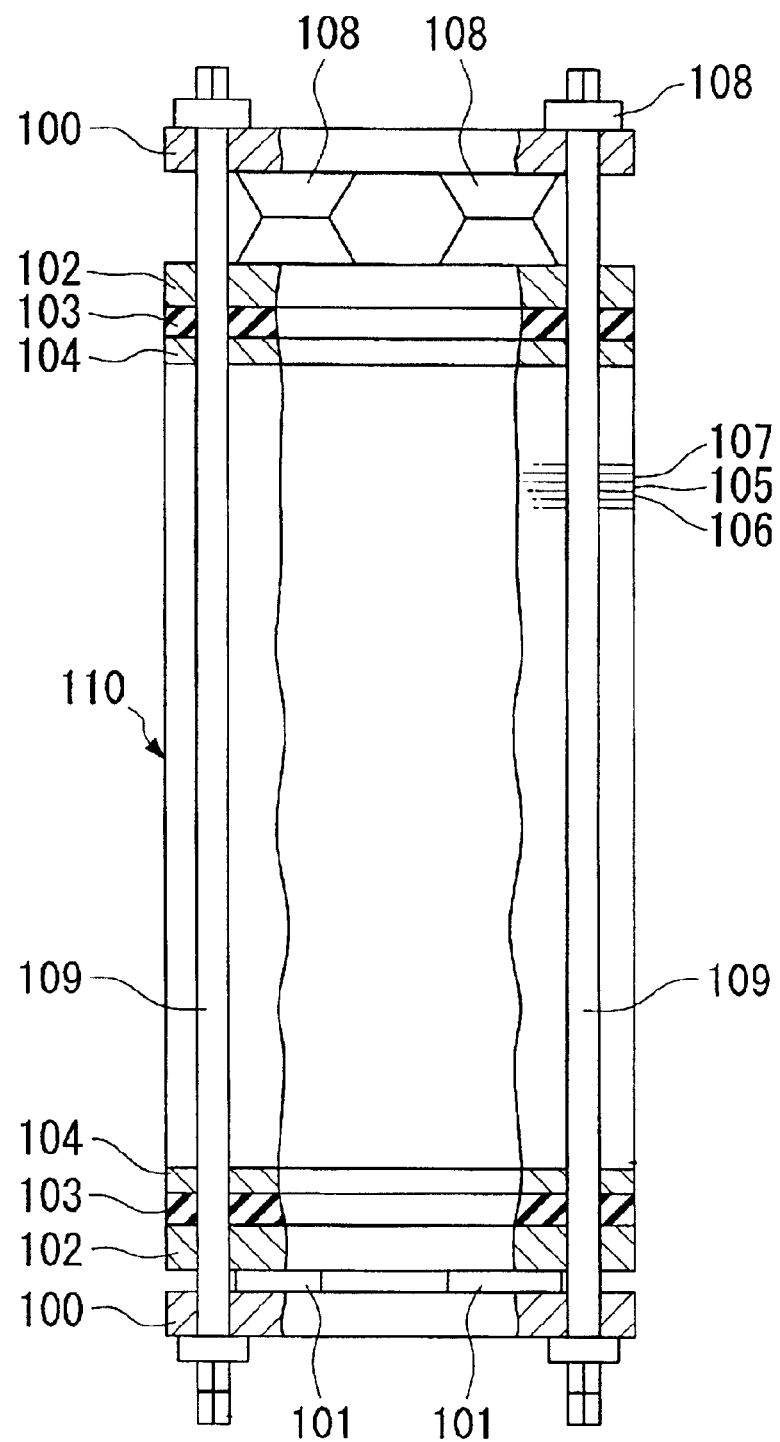
FIG. 7 is a cross-sectional side view showing a state of a conventional fuel cell stack during the assembling process.

In FIG. 6, the stud bolt 19 is divided into two divided portions 19a and 19b, and a male screw portion 49 is formed at the divided side of each of the divided portions 19a and 19b. Conversely, a threaded opening 50 is formed in the intermediate plate 39. Each stud bolt is fixed to the intermediate plate 39 by engaging the male screw portions 49 with the threaded opening 50, so that the movement in both the stacking direction and the direction perpendicular to the stacking direction is restricted.

Also in the above-explained embodiment, a single intermediate plate 39 is provided at the middle of the stacked body 17 in the stacking direction. However, a plurality of intermediate plates 39 may be provided at specific intervals, in a center portion of the stacked body 17 along the stacking direction. Preferably, the plurality of intermediate plates 39 are located in a manner such that the stacked sets of the unit fuel cell 14 and separators 15 and 16 are divided into an equal number of sets by the intermediate plates 17.

Furthermore, attachment members may be attached to the intermediate plate 39. In this case, the intermediate plate 39 is fastened to the panel 37 of the vehicle body via the attachment members.

What is claimed is:

1. A fuel cell stack comprising:

a stacked body having a plurality of stacked unit fuel cells, each unit fuel cell being placed between and supported by a pair of separators, wherein each unit fuel cell has an anode, a cathode, and an electrolyte membrane which is placed between the anode and the cathode;

fastening plates provided at either end of the stacked body in the stacking direction of the stacked body;

an intermediate plate provided at an intermediate position of the stacked body in the stacking direction; and bolt members inserted through the intermediate plate in the stacking direction in a manner such that the movement of the bolt members with respect to the intermediate plate in the direction perpendicular to the stacking direction is restricted so as to fix the relative position between the intermediate plate and the bolt members in the relevant direction, wherein the bolt members are also inserted through the fastening plates in the stacking direction, and the stacked body is fastened together by fastening the fastening plates towards the center of the fastening plates by using the bolt members.

2. A fuel cell stack as claimed in claim 1, wherein the movement of the bolt members with respect to the intermediate plate in the stacking direction is also restricted so as to fix the relative position between the intermediate plate and the bolt members in the relevant direction.

3. A fuel cell stack as claimed in claim 1, wherein:

each bolt member has a fitting portion; and the intermediate plate has a fitting hole into which the fitting portion of the bolt member is fit.

4. A fuel cell stack as claimed in claim 2, wherein:

each bolt member has a fitting portion; and the intermediate plate has a fitting hole into which the fitting portion of the bolt member is fit, wherein:

the fitting portion has a flange portion and the fitting hole has a corresponding step portion so as to restrict the movement of the bolt members with respect to the intermediate plate in the stacking direction.

5. A fuel cell stack as claimed in claim 1, wherein a plurality of intermediate plates through which the bolt members are inserted are provided, wherein the movement of the bolt members in the direction perpendicular to the stacking direction is restricted so as to fix the relative position between the intermediate plates and the bolt members in the relevant direction.

6. A fuel cell stack as claimed in claim 5, wherein the movement of the bolt members with respect to the intermediate plates in the stacking direction is also restricted so as to fix the relative position between the intermediate plates and the bolt members in the relevant direction.

7. A fuel cell stack as claimed in claim 1, wherein the intermediate plate is provided approximately at the center of the stacked body in the stacking direction.

8. A fuel cell stack as claimed in claim 1, wherein the bolt members are also inserted through the stacked body in the stacking direction.

* * * * *